March 1, 1932. C. T. BARTLETT 1,847,425

CARRIER DEVICE

Filed March 17, 1930

INVENTOR.
Carleton T. Bartlett
BY M. C. Frank
ATTORNEY

Patented Mar. 1, 1932

1,847,425

UNITED STATES PATENT OFFICE

CARLETON T. BARTLETT, OF BERKELEY, CALIFORNIA

CARRIER DEVICE

Application filed March 17, 1930. Serial No. 436,284.

The invention relates to a carrier for mounting on a motor vehicle, and more particularly to a mounting means for the carrier.

An object of the invention is to provide a means for mounting a carrier on an external part of a motor vehicle whereby the carrier is resiliently supported and at the same time is firmly held in its mounted position.

Another object is to provide a mounting of the character described which is applicable to a carrier providing a pet cage, whereby to minimize pet-fatiguing vibrations of the cage.

A further object of the invention is to provide mounting means of the character described whereby the carrier is held spaced from the supporting portion or portions of the vehicle to prevent marring of the surface finish of the adjacent vehicle parts.

The invention possesses other objects and features of advantage, some of which, with the foregoing, will be set forth or be apparent in the following description of a typical embodiment of the invention which is illustrated in the accompanying drawings, in which.

Figure 1:
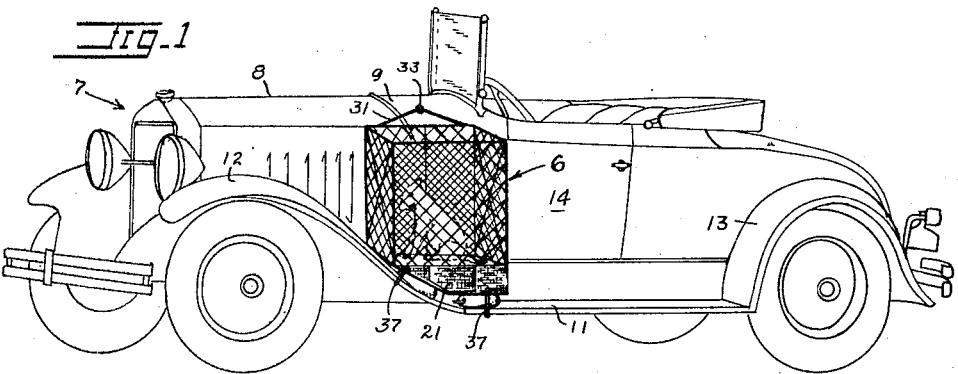
Figure 1 is a perspective view showing a receptacle mounted on an automobile in accordance with the present invention.
Figure 2:
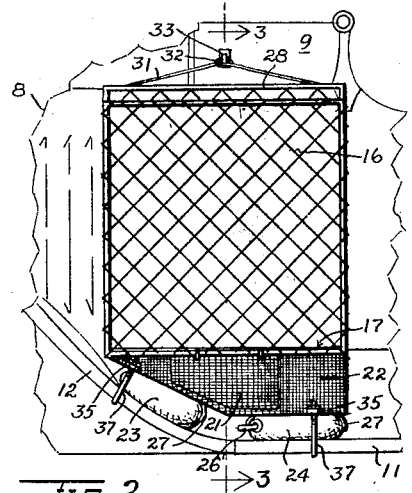
Figure 2 is an enlarged side elevation of the receptacle and the adjacent automobile parts.

As particularly illustrated, a carrier 6 is provided for mounting at a side of an automobile 7 and laterally opposite the engine hood 8, said hood including a rear and fixed cowl portion 9 thereof. As is usual, the automobile is provided along the sides thereof with running boards, the left-side running board 11 being particularly shown. Front and rear fenders 12 and 13 extend longitudinally from the respective ends of the running board to constitute, in effect, continuations thereof. Generally, and as particularly shown, the running board and front fender will be jointly utilized to provide a support for a receptacle of the present class the utilized length of each depending on the particular design of the automobile and the length of the carrier, since the carrier is preferably disposed entirely forwardly of the front door 14 of the automobile. The combination of the running board and fenders is seen to act as a mud guard and jointly provides a shelf-like apron extending laterally and horizontally from the side of the automobile body and generally at the bottom thereof. Since the front fender and running board are, and will generally be, jointly utilized as a support means, the fenders and running board will, on occasion, be hereinafter jointly referred to as an apron member of the vehicle.

Figure 5:
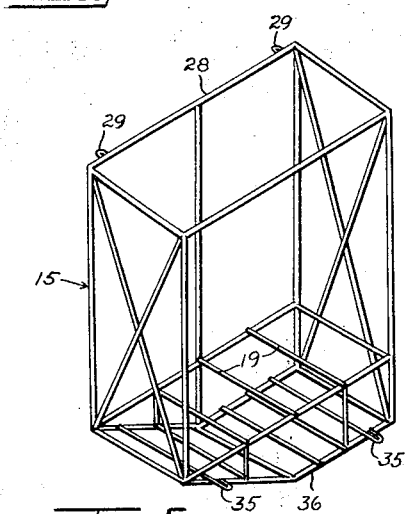
Figure 5 is a perspective view of the frame of the receptacle.
Figure 4:
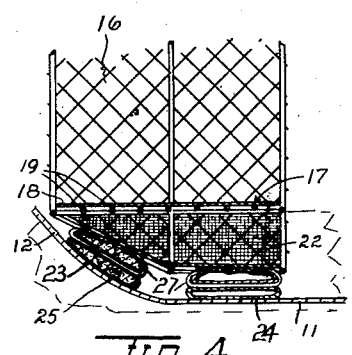
Figure 4 is a fragmentary section at 4—4 in Figure 3.

The carrier receptacle, it will now be noted, comprises an integral wire frame 15 (Figure 5) covered on certain and appropriate sides with wire mesh 16. The bottom of the receptacle is shaped generally to parallelism with the underlying supporting portions of the running board 11 and front fender 12 respectively, and a partition 17 extends horizontally from the front end of the receptacle bottom whereby to partition the receptacle. As shown, the said partition 17 comprises a flat plate 18 of wood or metal disposed on a plurality of cross-bars 19. The bottom of the receptacle is closed by an appropriately shaped plate. The side walls of the receptacle are covered with the mesh 16 and may be further covered with fabric or other more or less airtight material if such is desired. The present receptacle is open at the top and is arranged to provide in its upper portion a cage for a dog or other pet; a top closure may, of course, be provided if desired. The receptacle space below the partition 17 is arranged to provide storage space, as for food for the pet, and is provided with a hinged door 21 in the outer wall thereof, at least said wall and the other sides of said space being covered with fabric 22, as shown. The described receptacle structure, it is noted, is so formed and braced that it is relatively rigid, such being required for the use of the mounting means to be hereinafter described.

The receptacle is arranged for mounting in such position on the automobile that the outer face thereof is generally coplanar with the outer edge of the running board and fender thereat, and its base is narrower than the running board whereby it will not engage the automobile at the inward edge of the running board. The direct support of the receptacle is arranged to be afforded by cushioning members 23 and 24 engaged between the receptacle bottom and the apron member; as shown the aforesaid cushioning members respectively engage the front fender 12 and running board 11. The members 23 and 24 may be fixed to the bottom of the receptacle as shown, and preferably present non-abrasive faces against the surface portions of the fender and running board thereat whereby marring of the finish of said surface portions is avoided.

As particularly disclosed, the front cushion 23 comprises a loop of a porous and resilient material 25, such as a rubber composition, enclosed in a covering 26 of rubber tubing. The rear cushion 24, on the other hand, comprises a rubber tube formed in a continuous loop and provided with a valved stem 26' whereby this cushion may be inflated or deflated as desired. Fabric straps 27 passed through the loops of the cushions 23 and 24 secure the cushions to the receptacle bottom without exposing the straps for contact with the fender or running board. If desired, the front cushion may also be of the inflatable pneumatic type.

Extending inwardly from the top and inner frame member 28 are integral eyes 29 to which are attached the ends of a cord, or strap, 31 which is threaded through a metal ring 32. A hook member 33 is provided for mounting on the cowl portion 9 of the hood adjacent the top thereof, as by bolts 34, said hook being arranged to be engaged through the ring 32. The cord 31 is longitudinally inelastic and is of such length that it is tensed between the hook and receptacle when the latter is in its fixedly mounted position.

Figure 3:
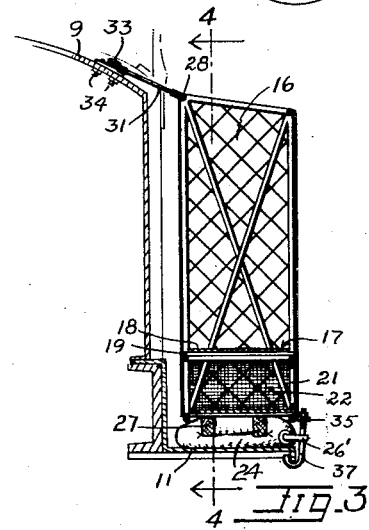
Figure 3 is a fragmentary section at 3—3 in Figure 2.

It is noted that the hook 33 is the only element of the mounting means which is to be permanently fixed to the vehicle and is preferably of ornamental design; and is so disposed with respect to the eyes 29 that the tensed cord will not engage the cowl surface. Integral eyes 35 extend horizontally outwardly from the lower outer member 36 of the receptacle frame, said eyes being arranged to receive the shanks of J-bolts 37 when the hook portions thereof are engaged beneath the outer edges of the apron member at the fender or running board portions thereof as the case may be, the relation being particularly shown in Figure 3.

For fixedly mounting the receptacle on the supporting apron member provided by the fender and running board, the receptacle is placed in desired position on the apron member, but with the pneumatic cushion 24 deflated. The ring 32 is engaged with the hook 33 and the J-bolts placed in their operative positions, after which the cushion is inflated until the receptacle is so lifted as to tense the cord and J-bolts to a required degree for firmly holding the receptacle in its mounted position. In this manner, the cord and J-bolts are seen to function as tension members while the cushion 24 functions as a compression member to cooperate with the tension members as a securing means. The cushioned support provided by the present arrangement is particularly desirable when the receptacle is used as a pet cage. For removing the receptacle, it is merely necessary to permit the deflation of the pneumatic cushion 24.

From the foregoing description taken in connection with the accompanying drawings, the advantages of the construction and method of operation will be readily understood by those skilled in the art to which the invention appertains, and while I have described the principle of operation, together with the device which I now consider to be the best embodiment thereof, I desire to have it understood that the device shown is merely illustrative, and that such changes may be made, when desired, as fall within the scope of the appended claims.

Having thus described my invention, I claim as new and desire to secure by Letters Patent of the United States the following:

1. In combination with a motor vehicle having a hood and an apron member extending laterally and horizontally outwardly thereof, said apron member including a running board and fender in coterminous and mutually aligned relation, a rigid receptacle disposed above said apron member and opposite said hood, a longitudinally unyielding tension member extending inwardly from said receptacle and having the inner end thereof detachably fixed to said hood, a longitudinally unyielding tension member detachably connected between the outer side of said receptacle and said apron member, and means including a pneumatic compression member engaged between the apron member and receptacle bottom whereby to hold the receptacle in entirely spaced and supported relation with respect to said apron member.

2. In combination with a motor vehicle having a hood and an apron member extending laterally and horizontally outwardly of the hood, said apron member including a running board and fender in coterminous and mutually aligned relation, a receptacle disposed above said member and opposite said hood, a pneumatic cushion supporting said receptacle on said member, and tension members extending from said receptacle to the hood and apron member and cooperative to secure said receptacle in mounted position on said cushion.

3. In combination with a motor vehicle having an apron member extending along a side thereof and horizontally outwardly therefrom, a carrier receptacle disposed above said member, tension members cooperatively preventing an upward displacement of said receptacle, and an air inflated cushion compressedly engaged between said receptacle and apron member, the inflation pressure in said cushion determining the degree of tensioning of said tension members.

4. In a device for mounting a receptacle providing a cage for a pet on the running board of an automobile or the like, a pneumatic cushion interposed between the running board and receptacle bottom to support the same, and tension members securing the receptacle against upward displacement, said cushion being adapted to contain an air pressure exceeding the weight pressure of said receptacle thereon.

5. In a carrier for mounting above the running board of an automobile, an inflatable element mounted on the bottom of said carrier, and means for restraining said carrier to a limited upward displacement thereof with respect to said running board whereby an inflation of said element will render said restraining means operative and thereby effect a pressure support of the carrier on the said inflated element.

6. In combination with an automobile running board and a receptacle mounted thereon, hooks extending from said receptacle to a position under said running board and resilient expandable means positioned between the receptacle and running board whereby expansion of said means will cause engagement of said hooks with said running board.

7. In combination with an automobile running board and a receptacle mounted thereon, hooks extending from said receptacle to a position under said running board and resilient expandable means positioned between the receptacle and running board whereby expansion of said means will cause engagement of said hooks with said running board and means connecting the upper end of said receptacle to said automobile.

In testimony whereof, I affix my signature.

CARLETON T. BARTLETT.